Nov. 6, 1934.                J. C. MARTIN, JR                1,979,977
                              VALVE AND PACKING
                           Original Filed July 7, 1930
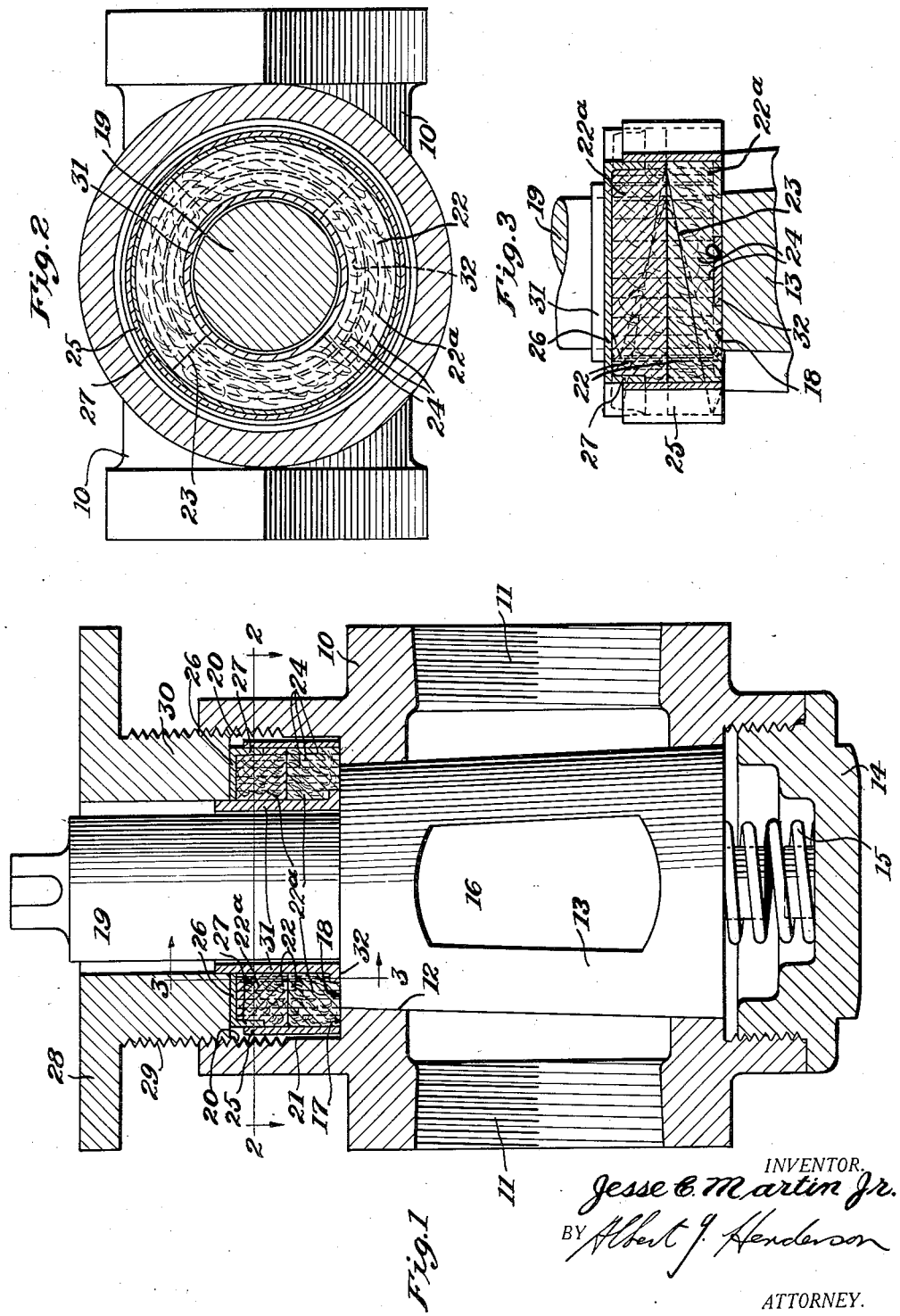
INVENTOR.
Jesse E. Martin Jr.
BY Albert J. Henderson
                        ATTORNEY.

Patented Nov. 6, 1934

1,979,977

UNITED STATES PATENT OFFICE 1,979,977

VALVE AND PACKING

Jesse C. Martin, Jr., Los Angeles, Calif., assignor to Walworth Patents Inc., Boston, Mass., a corporation of Massachusetts Original application July 7, 1930, Serial No. 466,203. Divided and this application October 25, 1932, Serial No. 639,438

2 Claims. (Cl. 288—1)

This invention relates broadly to packing elements, and more particularly to new and useful improvements in packings for valves, and specifically to an improved packing characterized by the embodiment therein of means for reducing friction between the parts affected and for facilitating adjustment of the packing.

While, for the sake of convenience, the packing of this invention is described and shown as embodied in a valve of the rotary plug type, it will be understood that the invention is capable of adaptation to other analogous devices, and therefore, finds a wide field of utility.

The principal objects and advantages which characterize this invention reside in the provision of an improved packing and gland construction; the provision of an improved packing for relatively movable elements, such as the body and seat of a rotary plug valve; the provision of an improved packing means and improved adjusting means therefor; the provision of an improved packing and means for reducing friction between the packing and the elements affected thereby; the provision of an improved packing element and means for facilitating relative movement of the elements affected thereby; the provision of an improved packing element and improved means for reducing strains on the packing element; the provision of an improved packing element and means constructed and arranged to serve for retarding the movement of the packing element in response to action by a gland member; the provision of an improved packing having a casing for limiting the contact of the packing with the elements affected to a predetermined area for facilitating relative movement of the parts; the provision of an improved packing element and means for facilitating adjustment and replacement of the packing element; the provision, in combination with an improved packing element, of an improved follower construction; the provision of an improved housing for the packing of a dissimilar material from that of the packing; and the provision, in a valve structure, of an improved packing element and retaining and adjusting means therefor which facilitates operation of the valve itself by reducing to a practical minimum the area of contact between the valve member and the packing and by interposing means for preventing undue friction between the packing and the body for facilitating adjustment of the packing proper.

This invention further includes the provision of an improved form of packing element wherein the component parts, are made tapered so that their respective surfaces properly engage and facilitate compression and expansion of the packing elements.

This application is a division of my copending application, Serial No. 466,203, filed July 7, 1930.

This invention finds special utility when employed in rotary plug valves and further objects and advantages reside in the provision of a packing and housing therefor which is heat resistant and is of such construction that frequent adjustment of the packing element may be had without material damage to the packing element or to the parts affected thereby.

The foregoing and such other objects and advantages as may appear or be pointed out as this description proceeds are attained in one structural embodiment of the invention, illustrated in the accompanying drawing in which:

Figure 1 is a vertical sectional view, partly in elevation, illustrating a valve including the improved packing;

Figure 2 is a sectional view taken on the line 2—2 of Figure 1 looking in the direction indicated by the arrows;

Figure 3 is a sectional view taken on the line 3—3 of Figure 1 looking in the direction indicated by the arrows.

Referring now more particularly to the drawing, it will be observed that a valve body 10 is provided having transverse passageways 11, 11 and a central tapering bore 12 in which is received a valve plug 13. The bottom of the bore 12 is open and a closure member 14 is inserted in said opening, a helical spring 15 maintaining the latter upon its seat formed by the bore 12. The valve plug is provided with a transverse passageway 16 which is adapted to be brought into register with the passageways 11 for controlling the flow of fluid therethrough.

It will be observed from Figure 1 that the upper end of the body 10 is provided with an annular shoulder 17 which is adapted to be substantially on the same plane with an annular shoulder 18 formed on the valve member 13. Said shoulder 18 is formed by reducing the valve to form a valve stem 19 which projects beyond the upper part of the body through an opening therein provided with internal threads 20. The threads 20 terminate short of the bottom of the opening, as indicated at 21, to form a smooth uninterrupted surface adjacent to the shoulder 17.

In order to prevent leakage past the valve seat and valve members adjacent to the shoulders 17 and 18, there is provided a packing element generally designated 22 seating upon said shoulders and preferably formed of a non-metallic substance including two or more shaped split rings 22a, 22a, the rings being cut as indicated at 23, and the adjacent ends secured together by a stitching 24, the split portions overlapping solid portions of the adjacent ring, which prevents leakage, and which prevents fraying of the material forming the packing, which, in the present instance, is preferably asbestos.

The cut or split 23 preferably extends about halfway around the rings 22a, 22a in the form of a helix, the terminal ends of each split opening on opposite faces of each ring as shown in Fig. 3. The helical split portions are therefore of substantial length and support each other when stitched together without tendency to rupture when one portion is under torsion due to rotation of the shoulder 18 of the valve member thereacross; the other portion meanwhile frictionally engaging the stationary shoulder.

In order to reduce strains on the packing and to prevent the latter from engaging the screw threads 20, and thus rendering difficult the adjustment of the packing by damaging the same and rendering difficult removal of the packing, I provide an improved housing which includes a cylindrical wall 25 interposed between the threads 20 and the adjacent surface of the packing, a follower member 26 being movable relatively to the wall 25 and having a flange 27 disposed within the confines of said wall. The follower 26 rests upon the upper end of the packing, as shown in Figure 1.

A gland member 28 is provided having a threaded portion 29 on the extension 30, said extension abutting the follower 26 and serving to cause said follower to bear upon the packing.

It will thus be seen that the housing formed by the elements 25 and 26 prevents undue friction between the gland and the packing and the body and seat packing so that adjustment of the packing to take up for wear is facilitated. This is particularly advantageous in valves where high pressures and temperatures are present which necessitate frequent taking up on the packing.

In order to facilitate movement of the valve in use by preventing undue friction between the valve and the packing, there is provided a cylindrical sleeve member 31 surrounding the valve stem 19 and lying between the latter and said packing and gland. The sleeve 31 is provided at its inner end with an annular flange 32 engaged between the packing so as to prevent the sleeve from becoming displaced outwardly. The sleeve 31 seats on the shoulder 18 formed on the valve, and the surface of the sleeve is adapted to engage the inner surfaces of the packing element and the gland member 30.

From the foregoing it will be observed that the sleeve 31 forms a means interposed between the packing element and a portion of the valve to facilitate movement of the valve, and that the members 25 and 26 serve to prevent damage to the packing on the threads 20 and also remove the difficulty usually encountered in replacing a packing of this nature. Furthermore, it will be observed that the members 25 and 26 and the sleeve 31 cooperate to concentrate the packing at the point where it is most needed, that is, the junction between the shoulders 17 and 18. This arrangement not only increases the life of the packing in that only that portion of the packing necessary to perform the function is exposed to the high temperature, but the arrangement also insures that the packing will be evenly compressed by the gland and will not become frayed or otherwise damaged by contact with the threads 20. Substantially all of the thrust causing compression of the packing which results in friction causing retardation of the movement of the plug in its seat is transmitted against the end of the plug and the shoulder 17.

I claim:

1. In a packing, a pair of rings of compressible material, each having a helical split extending through the body of the ring from one end surface to the other substantially halfway around the ring, a stitching extending through the width of each ring to secure the split portions together, said rings being arranged with the end surface of one abutting the end surface of the other, the terminal ends of the split in one of said rings being staggered relative to the terminal ends of the split in the other said ring to increase the resiliency of the abutting rings.

2. In a packing, a pair of rings of compressible material, each having a helical split extending through the body of the ring from one end surface to the other substantially halfway around the ring, a yieldable stitching extending through the width of each ring to secure the split portions together, said rings being arranged with the end surface of one abutting the end surface of the other, the terminal ends of the split in one of said rings being staggered relative to the terminal ends of the split in the other said ring to increase the resiliency of the abutting rings.

JESSE C. MARTIN, Jr.